United States Patent
Zhang

(10) Patent No.: US 12,028,832 B2
(45) Date of Patent: Jul. 2, 2024

(54) METHOD AND DEVICE FOR DISCONTINUOUS RECEPTION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 398 days.

(21) Appl. No.: 17/359,652

(22) Filed: Jun. 28, 2021

(65) Prior Publication Data

US 2021/0329600 A1    Oct. 21, 2021

Related U.S. Application Data

(63) Continuation of application No. PCT/CN2021/072852, filed on Jan. 20, 2021.

(30) Foreign Application Priority Data

Jan. 21, 2020 (CN) .......................... 202010071119.3

(51) Int. Cl.
 *H04W 72/02* (2009.01)
 *H04W 72/0446* (2023.01)
 (Continued)

(52) U.S. Cl.
 CPC ....... *H04W 72/02* (2013.01); *H04W 72/0446* (2013.01); *H04W 72/0453* (2013.01);
 (Continued)

(58) Field of Classification Search
 CPC ............. H04W 72/02; H04W 72/0446; H04W 72/0453; H04W 72/20; H04W 76/11; H04W 76/28
 See application file for complete search history.

(56) References Cited

U.S. PATENT DOCUMENTS

2019/0053251 A1*  2/2019  Loehr ............... H04W 72/1263
2019/0239112 A1   8/2019  Rao et al.
(Continued)

FOREIGN PATENT DOCUMENTS

EP    3481125 A1    5/2019
EP    3634061 A1    4/2020
(Continued)

OTHER PUBLICATIONS

ISR in application PCT/CN2021/072852 dated Apr. 19, 2021.

*Primary Examiner* — Donald L Mills

(57) ABSTRACT

The present disclosure provides a method and device for Discontinuous Reception. A first node receives first information; and senses a first radio signal in a first time resource pool; and selects a first time-frequency resource block from a first time-frequency resource pool, and transmits a first signaling in the first time-frequency resource block; herein, the first information indicates a first ID list; the first ID list comprises at least one Destination ID; the first radio signal comprises any Destination ID in the first ID list; any bit block identified by the at least one Destination ID is not a bit (bits) useful for the first node; the sensing action in the first time resource pool is used for determining the first time-frequency resource pool. The present disclosure prevents misunderstanding of the first time-frequency resource pool, thus reducing power consumption and radio interference.

20 Claims, 5 Drawing Sheets

(51) Int. Cl.
    *H04W 72/0453*     (2023.01)
    *H04W 72/20*       (2023.01)
    *H04W 74/0808*     (2024.01)
    *H04W 76/11*       (2018.01)
    *H04W 76/28*       (2018.01)
    *H04W 80/02*       (2009.01)

(52) U.S. Cl.
    CPC ....... *H04W 72/20* (2023.01); *H04W 74/0808* (2013.01); *H04W 76/11* (2018.02); *H04W 76/28* (2018.02); *H04W 80/02* (2013.01)

(56) References Cited

U.S. PATENT DOCUMENTS

2020/0053699 A1*   2/2020   Chen ................... H04W 72/02
2021/0227604 A1*   7/2021   Huang ................. H04W 72/02

FOREIGN PATENT DOCUMENTS

EP          3713318 A1    9/2020
WO       2019029652 A1    2/2019

* cited by examiner

METHOD AND DEVICE FOR DISCONTINUOUS RECEPTION

CROSS REFERENCE TO RELATED APPLICATIONS

This application is a continuation of International Application No. PCT/CN2021/072852, filed Jan. 20, 2021, claims the priority benefit of Chinese Patent Application No. 202010071119.3, filed on Jan. 21, 2020, the full disclosure of which is incorporated herein by reference.

BACKGROUND

Technical Field

The present disclosure relates to methods and devices in wireless communication systems, and in particular to a scheme and a device in a wireless communication system that support Discontinuous Reception.

Related Art

Discontinuous Reception (DRX) is a method commonly used in cellular communications to reduce power consumption of communication terminals and lengthen standby time. A base station manages a DRX-related timer through Downlink Control Information (DCI) or Medium Access Control (MAC) Control Element (CE), and then, controls whether a terminal performs wireless reception in a given subframe.

As a significant application scenario of cellular communications, Vehicle to everything (V2X) helps realize direct communications between two communication terminals.

At the 3rd Generation Partner Project (3GPP) Radio Access Network (RAN) #86 Plenary, a research project of V2X DRX was officially approved.

SUMMARY

In conventional DRX, a base station and a User Equipment (UE) can readily reach a common understanding of whether the UE senses a Physical Downlink Control CHannel (PDCCH) in a slot. Such feature, as inventors find through researches, is being challenged in V2X: a receiving UE is probably sensing useful signals sent by multiple transmitting UEs, so any useful signal sent by any one of the multiple transmitting UEs may have some impact on a DRX timer of the receiving UE and worse still, the lack of coordination between these transmitting UEs makes it easier to cause disagreement between the transmitting UEs and the receiving UE over the understanding of DRX state.

To address the above problem, the present disclosure provides a solution. It should be noted that though the present disclosure only took the V2X scenario for example or as a typical scenario in the statement above, it is also applicable to other scenarios confronting the same difficulty, including downlink transmissions, where similar technical effects can be achieved. Additionally, the adoption of a unified solution for various scenarios, including but not limited to NR V2X and downlink communications, contributes to the reduction of hardcore complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:
  receiving first information; and sensing a first radio signal in a first time resource pool; and
  selecting a first time-frequency resource block from a first time-frequency resource pool, and transmitting a first signaling in the first time-frequency resource block;
  herein, the first information indicates a first identity (ID) list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

In traditional V2X, a UE only needs to sense Sidelink Control Information (SCI) containing its own Destination ID, by contrast, in the method proposed herein, a first node is required to sense at least one bit block other than its own Destination ID, and further determine the first time-frequency resource pool accordingly. So, the above method possesses inventiveness compared with the prior art.

In one embodiment, the above method enables multiple nodes to sense radio signals comprising a same ID list, so as to develop the same understanding of DRX state of a node.

In one embodiment, as stated in the above method, a transmitter of first information can control a Destination ID list of a radio signal sensed by a first node, thereby controlling the understanding of the DRX state by the first node.

In one embodiment, the first node is a UE.

In one embodiment, the first node is a relay node.

In one embodiment, the first ID list comprises a Destination ID indicating the first node.

In one subembodiment of the above embodiment, if the first node transmits a radio signal comprising any Destination ID in the first ID list in the first time resource pool, the first node determines that the first radio signal is sensed.

In one embodiment, the first ID list comprises a Destination ID indicating a terminal group that comprises the first node.

Specifically, according to one aspect of the present disclosure, when the first radio signal is not successfully received in the first time resource pool, maintain counting of a first reference timer; when the first radio signal is successfully received in the first time resource pool, restart a first reference timer;
  herein, in time domain the first time-frequency resource pool is not overlapping with time during which the first reference timer is halted.

Specifically, according to one aspect of the present disclosure, when the first radio signal is not successfully received in the first time resource pool, maintain a halted state of a first reference timer; when the first radio signal is successfully received in the first time resource pool, start a first reference timer;
  herein, in time domain the first time-frequency resource pool is not overlapping with time during which the first reference timer is halted.

Specifically, according to one aspect of the present disclosure, a channel occupied by the first radio signal is a Physical Sidelink Control CHannel (PSCCH), and any Destination ID in the first ID list is a Destination ID field in SCI.

In one embodiment, compared with indicating a higher-layer Destination ID, the above method reduces a number of bits indicated by first information more remarkably and enhances spectrum efficiency.

Specifically, according to one aspect of the present disclosure, a transmission channel occupied by the first radio signal is a SideLink Shared CHannel (SL-SCH), and any Destination ID in the first ID list is a Destination Layer-2 ID.

In one embodiment, a physical layer channel occupied by the first radio signal is a Physical Sidelink Shared CHannel (PSSCH).

In one embodiment, compared with indicating a physical-layer Destination ID, the above method can prevent DRX activation caused due to SCI conflicts.

Specifically, according to one aspect of the present disclosure, a transmitter of the first information is a second node, and any Destination ID in the first ID list belongs to a Destination Layer-2 ID of the second node.

Specifically, according to one aspect of the present disclosure:

the first transmitter, which transmits a target signal in the first time resource pool, the target signal comprising a Destination ID in the first ID list;

herein, the first radio signal is deemed as being successfully received in the first time resource pool no matter whether the first radio signal is detected during the sensing in the first time resource pool.

In one embodiment, the first receiver stops sensing the first radio signal in the first time resource pool and starts a first timer.

In one embodiment, the first receiver stops sensing the first radio signal in the first time resource pool and restarts a first timer.

In one embodiment, the first receiver receives a Hybrid Auto Repeat reQuest (HARQ)-ACK for the target signal.

In one embodiment, the first receiver receives an ACK for the target signal.

In one embodiment, the above method prevents the first node from continuing sensing on the first radio signal, thus conserving power.

The present disclosure provides a method in a second node for wireless communications, comprising:

transmitting first information; and sensing a first radio signal in a first time resource pool; and sensing a first signaling in a first time-frequency resource block;

herein, the first information indicates a first ID list; the first ID list comprises at least one Destination ID; the first radio signal comprises any Destination ID in the first ID list; a bit block identified by the at least one Destination ID is a bit (bits) useful for the second node; the sensing action in the first time resource pool is used for determining the first time-frequency resource pool.

In traditional V2X, a UE only needs to sense SCI containing its own Destination ID rather than send out its Destination ID list; therefore, the above method possesses inventiveness compared with the prior art.

In traditional V2X, a UE only needs to sense SCI containing its own Destination ID rather than determine a first time resource pool based on its Destination ID list; therefore, the above method possesses inventiveness compared with the prior art.

In one embodiment, on the premise that both a first node and a second node perform precise sensing on a first radio signal, the two nodes will share a common understanding of a first time-frequency resource pool, thus avoiding misunderstanding.

Specifically, according to one aspect of the present disclosure, when the first radio signal is not successfully received in the first time resource pool, counting of a first timer is maintained; when the first radio signal is successfully received in the first time resource pool, a first timer is restarted;

herein, in time domain the first time-frequency resource pool comprises time during which the first timer is operating.

In one embodiment, on the premise that both a first node and a second node perform precise sensing on a first radio signal, the first timer maintained by the second node and a first reference timer maintained by the first node shall have a same reading, thereby ensuring that both nodes have a same understanding of the first time-frequency resource pool.

Specifically, according to one aspect of the present disclosure, when the first radio signal is not successfully received in the first time resource pool, a halted state of a first timer is maintained; when first radio signal is successfully received in the first time resource pool, a first timer is started;

herein, in time domain the first time-frequency resource pool comprises time during which the first timer is operating.

Specifically, according to one aspect of the present disclosure, a channel occupied by the first radio signal is a PSCCH, and any Destination ID in the first ID list is a Destination ID field in SCI.

Specifically, according to one aspect of the present disclosure, a transmission channel occupied by the first radio signal is an SL-SCH, and any Destination ID in the first ID list is a Destination Layer-2 ID.

Specifically, according to one aspect of the present disclosure, any Destination ID in the first ID list belongs to a Destination Layer-2 ID of the second node.

The present disclosure provides a first node for wireless communications, comprising:

a first receiver, which receives first information; and senses a first radio signal in a first time resource pool; and a first transmitter, which selects a first time-frequency resource block from a first time-frequency resource pool, and transmits a first signaling in the first time-frequency resource block;

herein, the first information indicates a first identity (ID) list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

The present disclosure provides a second node for wireless communications, comprising:

a second transmitter, which transmits first information; and a second receiver, which senses a first radio signal in a first time resource pool; and senses a first signaling in a first time-frequency resource block;

herein, the first information indicates a first ID list; the first ID list comprises at least one Destination ID; the first radio signal comprises any Destination ID in the first ID list; a bit block identified by the at least one Destination ID is a bit (bits) useful for the second node; the sensing action in the first time resource pool is used for determining the first time-frequency resource pool.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
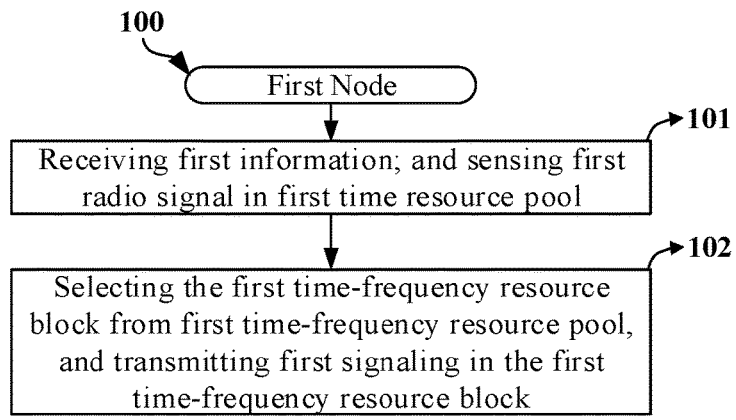
FIG. 1 illustrates a flowchart of sensing a first radio signal and a first signaling according to one embodiment of the present disclosure.

Embodiment 1 illustrates a flowchart of sensing a first radio signal and a first signaling according to one embodiment of the present disclosure, as shown in FIG. 1.

In Embodiment 1, a first node 100 receives first information in step 101; senses a first radio signal in a first time resource pool; and selects a first time-frequency resource block from a first time-frequency resource pool and transmits a first signaling in the first time-frequency resource block in step 102.

In Embodiment 1, the first information indicates a first ID list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

In one embodiment, each Destination ID in the first ID list comprises Y bits, Y being a positive integral multiple of 8.

In one embodiment, Y is 8.

In one embodiment, Y is 16.

In one embodiment, Y is 24.

In one embodiment, the first ID list only comprises a Destination ID, the Destination ID indicating a group of UEs.

In one embodiment, the first ID list comprises multiple Destination IDs.

In one embodiment, each Destination ID among the multiple Destination IDs indicates a UE.

In one embodiment, at least one Destination ID among the multiple Destination IDs indicates a group of UEs.

In one embodiment, the first signaling is SCI.

In one embodiment, a format of the first signaling is SCI Format 0-2.

In one embodiment, a format of the first signaling is SCI Format 0.

In one embodiment, time-frequency resources occupied by the first radio signal are indicated by 1st stage SCI; a HARQ process ID and a New Data Indicator (NDI) of the first radio signal are indicated by 2nd stage SCI.

In one embodiment, a first bit block is used for generating the first radio signal.

In one embodiment, the first radio signal is obtained by a first bit block sequentially through channel coding, scrambling, modulation, layer mapping, precoding, resource mapping and generation of multicarrier symbols.

In one embodiment, the first radio signal is obtained by a first bit block sequentially through CRC Insertion, channel coding, scrambling, modulation, resource mapping and generation of multicarrier symbols.

In one embodiment, the first radio signal is obtained by a first bit block through scrambling, CRC coding, channel coding, rescrambling, modulation, resource mapping and generation of multicarrier symbols.

In one embodiment, the first bit block comprises SCI.

In one embodiment, the first bit block comprises a Transport Block (TB).

In one embodiment, the phrase of sensing a first radio signal includes performing channel decoding in scheduled time-frequency resources and determining according to Cyclic Redundancy Check (CRC) whether the channel decoding is correct.

In one embodiment, the phrase of sensing a first radio signal includes performing blind decoding, and determining according to CRC whether SCI is sensed.

In one embodiment, the phrase of sensing a first radio signal includes that: if CRC is not passed, it is determined that a first radio signal is not received.

In one embodiment, the phrase of sensing a first radio signal includes that: if CRC is passed; when an information bit decoded comprises any Destination ID in the first ID list, it is determined that a first radio signal is received; when a Destination ID in an information bit decoded does not belong to the first ID list, it is determined that the first radio signal is not received.

In one embodiment, if CRC is not passed, the first radio signal is not successfully received in the sensing; if the CRC is passed, an information bit that has been through channel decoding is conveyed to a higher layer, and the higher layer determines whether the first radio signal is successfully received.

In one embodiment, the first bit block is transmitted on a SideLink Shared CHannel (SL-SCH).

In one embodiment, the first bit block is transmitted on a DownLink Shared CHannel (DL-SCH).

In one embodiment, the phrase of sensing a first signal includes decoding an information bit block conveyed from a physical layer on a MAC layer, and determining whether a first radio signal is correctly received based on the meaning of the information bit block.

In one embodiment, when the information bit block comprises any Destination ID in the first ID list, it is determined that the first radio signal is successfully received; otherwise, it is determined that the first radio signal is not received.

In one embodiment, the first information comprises the first ID list.

In one embodiment, the first information comprises a first application layer ID list, the first application layer ID list being mapped as the first ID list.

In one embodiment, application layer IDs in the first application layer ID list respectively correspond to Destination IDs in the first ID list.

In one subembodiment, a mapping relation between any application layer ID in the first application layer ID list and a corresponding Destination ID in the first ID list is fixed.

In one subembodiment, 16 Least Significant Bits (LSBs) of any application layer ID in the first application layer ID list are a corresponding Destination ID in the first ID list.

In one subembodiment, 24 LSBs of any application layer ID in the first application layer ID list are a corresponding Destination ID in the first ID list.

In one subembodiment, 24 Most Significant Bits (MSBs) of any application layer ID in the first application layer ID list are a corresponding Destination ID in the first ID list.

In one embodiment, a mapping from any application layer ID in the first application layer ID list to any Destination ID in the first ID list is completed by a ProSe application in the first node.

In one embodiment, any Destination ID in the first ID list is a part of a link-layer ID.

In one embodiment, any Destination ID in the first ID list is a link-layer ID.

In one embodiment, the first ID list comprises multiple Destination IDs, and a bit block identified by any of the multiple Destination IDs is not a bit (bits) useful for the first node.

In one embodiment, the first ID list only comprises one Destination ID.

In one embodiment, the first information is transmitted on sidelink.

In one embodiment, any Destination ID in the first ID list belongs to a Destination Layer-2 ID, the phrase that a bit block identified by the at least one Destination ID is not a bit (bits) useful for the first node comprising: any Destination Layer-2 ID of the first node does not comprise the at least one Destination ID.

In one embodiment, the phrase that a bit block identified by the at least one Destination ID is not a bit (bits) useful for the first node comprises that: the first node does not perform channel decoding for a PSSCH scheduled by SCI carrying the at least one Destination ID.

In one subembodiment, the at least one Destination ID comprises 16 bits.

In one subembodiment, the at least one Destination ID comprises 16 LSBs of a Destination Layer-2 ID.

In one embodiment, the phrase that a bit block identified by the at least one Destination ID is not a bit (bits) useful for the first node comprises that: a MAC entity of the first node doesn't distribute a MAC Protocol Data Unit (PDU) carrying the at least one Destination ID to a disassembly and demultiplexing entity.

In one subembodiment, the at least one Destination ID comprises 24 bits.

In one subembodiment, the at least one Destination ID is a Destination Layer-2 ID.

In one embodiment, the sensing action in the first time resource pool is used for determining whether a second node is at an active time, a target receiver of the first signaling comprising the second node.

In one embodiment, the first time-frequency resource pool belongs to the active time of the second node in time domain.

In one embodiment, the first node preferentially chooses the active time of the second node to transmit the first signaling.

In one embodiment, only when idle buffer of the first node is lower than a first threshold can the first node choose non-active time of the second node to transmit the first signaling.

In one embodiment, only when the priority of the first signaling is higher than a second threshold can the first node choose non-active time of the second node to transmit the first signaling.

In one embodiment, only when the format of the first signaling is a specific format can the first node choose non-active time of the second node to transmit the first signaling.

In one embodiment, a number of Resource Elements (REs) comprised in the first time-frequency resource pool is greater than a number of REs comprised in the first time-frequency resource block.

In one embodiment, the first time-frequency resource pool and the first time-frequency resource block respectively comprise multiple REs.

In one embodiment, the first time-frequency resource pool comprises multiple time-frequency resource blocks, and each of the multiple time-frequency resource blocks is continuous in time domain, and the first time-frequency resource block is one of the multiple time-frequency resource blocks, among the multiple time-frequency resource blocks at least two time-frequency resource blocks being discontinuous in time.

In one embodiment, the first time-frequency resource block is two different time-frequency resource blocks among the multiple time-frequency resource blocks.

In one embodiment, how to select the first time-frequency resource block is implementation-related.

In one embodiment, the first time-frequency resource block is selected randomly from the first time-frequency resource pool.

In one embodiment, the first time-frequency resource pool is self-determined by the first node.

In one embodiment, the first time-frequency resource pool is configured by a downlink signaling.

In one embodiment, the first time-frequency resource pool is a V2X Resource Pool.

In one embodiment, a method in LTE Standard TS36.213 is employed to select the first time-frequency resource block, namely, to select an available time-frequency resource block set according to measured channel quality and the priority carried in SCI and then to select the first time-frequency resource block from the available time-frequency resource block set by a higher layer.

In one embodiment, how to determine the first time-frequency resource pool according to the sensing action in the first time resource pool is related to implementation (i.e., it is self-determined by terminal manufacturers, hence no need for standardization).

In one embodiment, when the first radio signal is successfully received in the first time resource pool, the first time-frequency resource pool comprises a first slot in time domain; when the first radio signal is not successfully received in the first time resource pool, the first time-frequency resource pool doesn't comprise the first slot in time domain.

In one embodiment, when the first radio signal is successfully received in the first time resource pool, the first time-frequency resource pool comprises a first slot in time domain; when the first radio signal is not successfully received in the first time resource pool, and a first condition set is unfulfilled, the first time-frequency resource pool doesn't comprise the first slot in time domain.

The above embodiment is characterized in that when the first condition set is fulfilled (no matter whether the first radio signal is successfully received in the first time resource pool), the first time-frequency resource pool comprises a first slot in time domain.

In one embodiment, the first condition set comprises that idle buffer of the first node is lower than a first threshold.

In one embodiment, the first condition set comprises that the priority of the first signaling is higher than a second threshold.

In one embodiment, the first condition set comprises that a format of the first signaling is a specific signaling format.

In one embodiment, the first threshold is a percentage greater than 0 and less than 1.

In one embodiment, the first threshold is measured by byte.

In one embodiment, the second threshold is an integer between 0 and 255.

In one embodiment, the first time-frequency resource block comprises multiple Resource Elements (REs).

In one embodiment, the first time-frequency resource block belongs to a carrier in frequency domain.

In one embodiment, the first time-frequency resource block comprises multiple subcarriers.

In one embodiment, the first time-frequency resource block comprises a positive integer number of multicarrier symbol(s) in time domain.

In one embodiment, the first time-frequency resource block is reserved for a physical layer control signaling.

In one embodiment, the first time-frequency resource block is reserved for SCI.

In one embodiment, the multicarrier symbol is an Orthogonal Frequency Division Multiplexing (OFDM) symbol.

In one embodiment, the multicarrier symbol is a Single-carrier Frequency-Division Multiple Access (SC-FDMA) symbol.

In one embodiment, the multicarrier symbol is a Filter-bank Multicarrier (FBMC).

In one embodiment, any Destination ID in the first ID list is a Prose UE ID.

Embodiment 2

Figure 2:
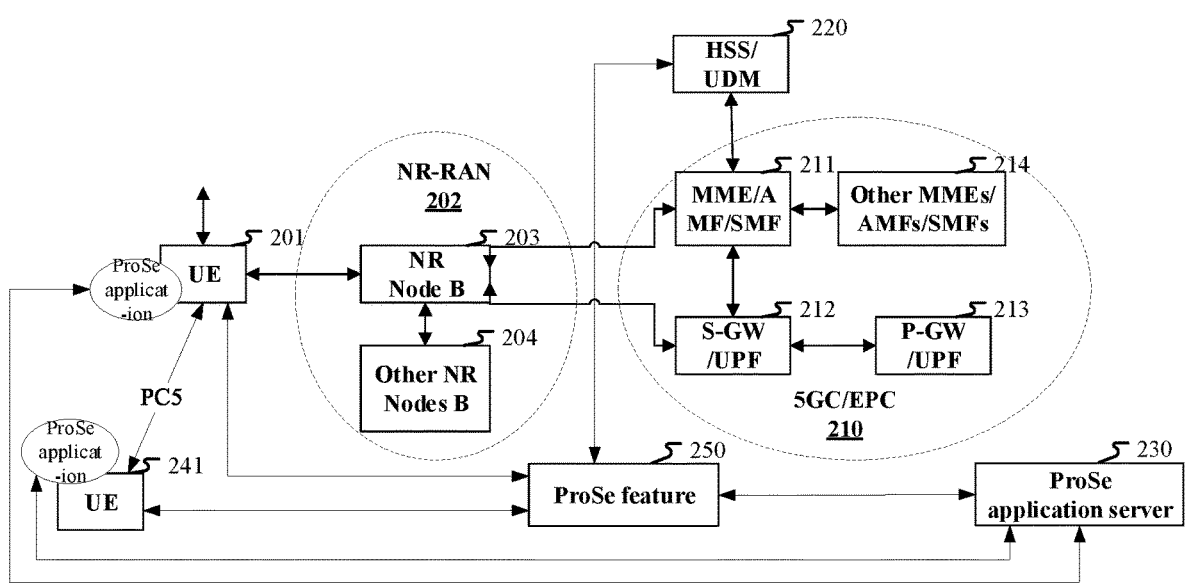
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the UE 241 are connected via a PC5 Reference Point.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PC1 Reference Point.

In one embodiment, the first node in the present disclosure is the UE 201.

In one embodiment, the second node in the present disclosure is the UE 201.

In one embodiment, the first node in the present disclosure is the UE 241.

In one embodiment, the second node in the present disclosure is the UE 241.

In one embodiment, the first node and the second node in the present disclosure are respectively the UE 201 and the UE 241.

In one embodiment, a wireless link between the UE 201 and the UE 241 corresponds to a sidelink (SL) in the present disclosure.

In one embodiment, a wireless link from the UE 201 to the NR Node B is an uplink.

In one embodiment, a wireless link from the NR Node B to the UE 201 is a downlink.

In one embodiment, the UE 201 supports DRX transmission.

In one embodiment, the UE 241 supports DRX transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station supporting large delay difference.

In one embodiment, the gNB 203 is a flight platform.

In one embodiment, the gNB 203 is satellite equipment.

Embodiment 3

Figure 3:
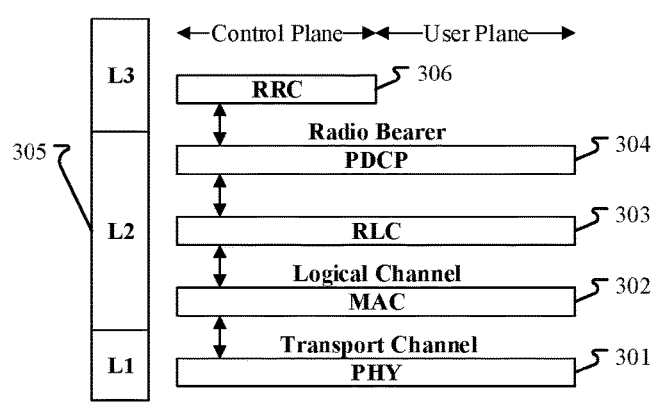
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 layer 305 belongs to a higher layer.

In one embodiment, the RRC sublayer 306 in the L3 belongs to a higher layer.

Embodiment 4

Figure 4:
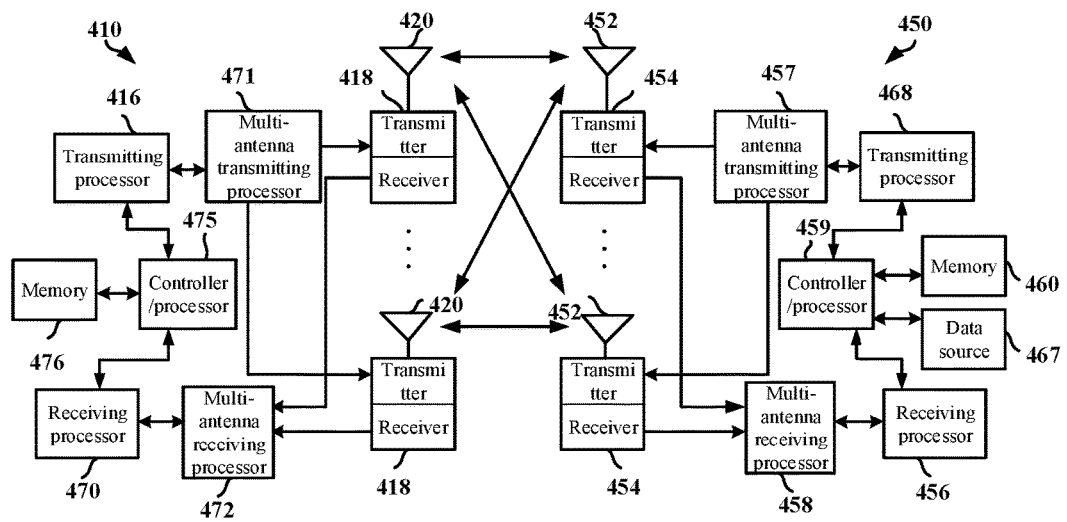
FIG. 4 illustrates a schematic diagram of hardcore modules of a communication node according to one embodiment of the present disclosure.

Embodiment 4 illustrates a schematic diagram of hardcore modules of a communication node according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives first information; senses a first radio signal in a first time resource pool; selects a first time-frequency resource block from a first time-frequency resource pool; and transmits a first signaling in the first time-frequency resource block; herein, the first information indicates a first ID list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

In one embodiment, the first communication device 450 comprises a memory that stores a computer readable instruction program. The computer readable instruction program generates actions when executed by at least one processor. The actions include receiving first information; sensing a first radio signal in a first time resource pool; selecting a first time-frequency resource block from a first time-frequency resource pool; and transmitting a first signaling in the first time-frequency resource block; herein, the first information indicates a first ID list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits first information; senses a first radio signal in a first time resource pool; and senses a first signaling in a first time-frequency resource block; herein, the first information indicates a first ID list; the first ID list comprises at least one Destination ID; the first radio signal comprises any Destination ID in the first ID list; a bit block identified by the at least one Destination ID is a bit (bits) useful for the second node; the sensing action in the first time resource pool is used for determining the first time-frequency resource pool.

In one embodiment, the second communication device 410 comprises a memory that stores a computer readable instruction program. The computer readable instruction program generates actions when executed by at least one processor. The actions include transmitting first information; sensing a first radio signal in a first time resource pool; and sensing a first signaling in a first time-frequency resource block; herein, the first information indicates a first ID list; the first ID list comprises at least one Destination ID; the first radio signal comprises any Destination ID in the first ID list; a bit block identified by the at least one Destination ID is a bit (bits) useful for the second node; the sensing action in the first time resource pool is used for determining the first time-frequency resource pool.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the second communication device 410 is a UE.

In one embodiment, the antenna 452, the receiver 454, the multi-antenna receiving processor 458, the receiving processor 456, the controller/processor 459 are used for sensing a first radio signal.

In one embodiment, the antenna 420, the transmitter 418, the multi-antenna transmitting processor 471, the transmitting processor 416, the controller/processor 475 are used for transmitting first information.

Embodiment 5

Figure 5:
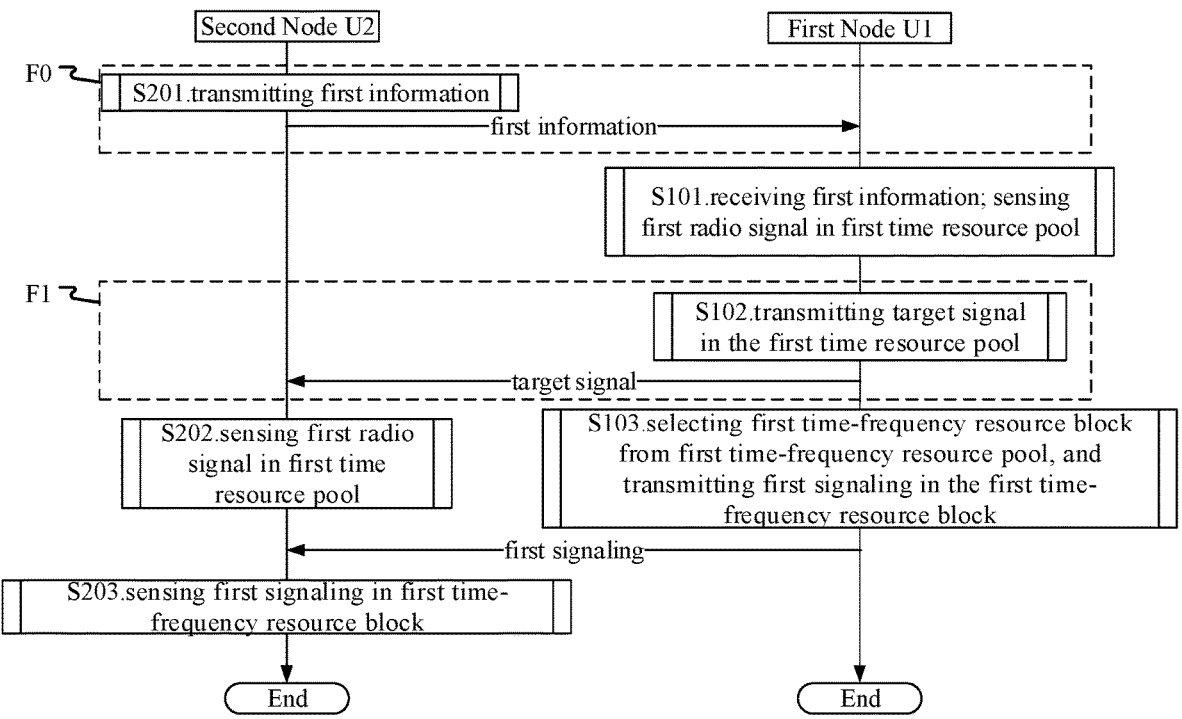
FIG. 5 illustrates a flowchart of transmission between a first node and a second node according to one embodiment of the present disclosure.

Embodiment 5 illustrates a flowchart of transmission between a first node and a second node according to one embodiment of the present disclosure, as shown in FIG. 5. In FIG. 5, steps respectively marked by the box F0 and the box F1 are optional.

A first node U1 receives first information in step S101; and senses a first radio signal in a first time resource pool; and transmits a target signal in the first time resource pool in step S102, the target signal comprising a Destination ID in the first ID list; selects a first time-frequency resource block from a first time-frequency resource pool, and transmits a first signaling in the first time-frequency resource block in step S103; herein, the sensing action in the first time resource pool is used by the first node U1 for determining the first time-frequency resource pool; when the step S102 is implemented, no matter whether the first radio signal is detected by the sensing in the first time resource pool, the first radio signal is deemed by the second node U2 to be successfully received in the first time resource pool.

A second node U2 transmits first information in step S201; senses a first radio signal in a first time resource pool in step S202; and senses a first signaling in a first time-frequency resource block in step S203; herein, the sensing action in the first time resource pool is used by the second node U2 for determining the first time-frequency resource pool.

In Embodiment 5, the first information indicates a first ID list; the first ID list comprises at least one Destination ID; the first radio signal comprises any Destination ID in the first ID list; a bit block identified by the at least one Destination ID is a bit (bits) useful for the second node U2 rather than to the first node U1.

In one embodiment, the bit block identified by the at least one Destination ID is a piece of SCI; the first node U1 does not perform channel decoding on a PSSCH scheduled by the SCI; the second node U2 performs channel decoding on the PSSCH scheduled by the SCI.

In one embodiment, the bit block identified by the at least one Destination ID comprises a MAC PDU; the first node U1 does not distribute the bit block identified by the at least one Destination ID to a disassembly and demultiplexing entity; the second node U2 distributes the bit block identified by the at least one Destination ID to a disassembly and demultiplexing entity.

In one embodiment, any Destination ID in the first ID list belongs to a Destination Layer-2 ID.

In one embodiment, the step S201 does not exist, and a transmitter of the first information is a ProSe feature.

In one embodiment, the step S201 exists, the first ID list comprises multiple Destination IDs, and a bit block identified by any one of the multiple Destination IDs is a bit (bits) useful for the second node U2.

In one embodiment, a transmitter of the first information is a second node U2, and any Destination ID in the first ID list belongs to a Destination Layer-2 ID of the second node U2.

In one subembodiment of the above embodiment, any Destination Layer-2 ID of the second node comprises a Destination ID in the first ID list.

In one subembodiment of the above embodiment, the multiple Destination IDs comprised in the first ID list respectively belong to multiple Destination Layer-2 IDs of the second node.

In one subembodiment of the above embodiment, for a PSSCH scheduled by SCI comprising any Destination ID in the first ID list, the second node performs channel decoding.

In one subembodiment of the above embodiment, for a MAC PDU carrying any Destination ID in the first ID list, a MAC entity of the first node distributes the MAC PDU to a disassembly and demultiplexing entity.

In one embodiment, a transmission channel occupied by the first radio signal is a SideLink Shared CHannel (SL-SCH), and any Destination ID in the first ID list is a Destination Layer-2 ID.

In one embodiment, any Destination ID in the first ID list belongs to a Destination Layer-2 ID.

In one embodiment, a transmitter of the first information is a ProSe feature.

In one embodiment, a transmitter of the first information is a ProSe application of the first node.

In one embodiment, the step S201 exists, and the first information is determined by the second node U2 according to an application ID conveyed from a ProSe application of the second node U2.

In one embodiment, a number of bits comprised in the application ID is greater than a number of bits comprised in any Destination ID in the first ID list.

In one embodiment, the phrase of sensing a first signaling includes performing blind decoding.

In one embodiment, the phrase of sensing a first signaling includes performing energy detection.

In one embodiment, the phrase of sensing a first signaling includes performing CRC.

In one embodiment, the phrase of sensing a first signaling includes performing blind decoding on each RE set of multiple RE sets, for each blind decoding, determine whether the decoding is correct according to CRC, if so, and a first field in SCI decoded belongs to a Layer-2 Source ID of the first node U1, the first signaling is detected.

In one subembodiment of the above embodiment, the first field comprises a Source ID field.

In one embodiment, a channel occupied by the first radio signal is a PSCCH, and any Destination ID in the first ID list is a Destination ID field in SCI.

In one embodiment, the step S102 exists, and the first node U1 stops sensing the first radio signal in the first time resource pool after the step S102.

In one embodiment, the step S102 exists, and the first node U1 stops sensing the first radio signal in the first time resource pool after an ACK associated with the target signal is received.

In one embodiment, the step S102 exists, and the second node U2 stops sensing the first radio signal in the first time resource pool after the target signal is received.

In one embodiment, the step S102 exists, and the second node U2 determines that the first radio signal is received in the first time resource pool after the target signal is received.

In one embodiment, the Destination ID comprised in the target signal belongs to a link-layer ID used for indicating the first node.

In one embodiment, the target signal is transmitted on a PSSCH, and the Destination ID comprised in the target signal is a Source Layer-2 ID of the first node.

In one embodiment, the target signal is transmitted on a PSCCH, and the Destination ID comprised in the target signal is a Source ID field.

In one embodiment, the Destination ID comprised in the target signal is a Source ID field in the first signaling.

In one embodiment, the first node assumes that the first radio signal comprising the Destination ID in the first ID list is not detected in the first time resource pool.

In one embodiment, the sensing in the first time resource pool is for any other Destination ID in the first ID list other than the Destination ID.

Embodiment 6

Figure 6:
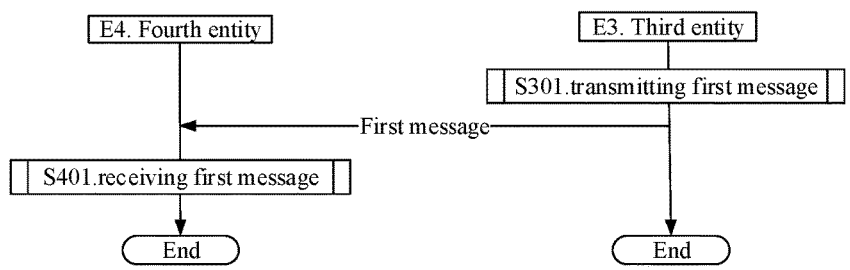
FIG. 6 illustrates a flowchart of transmission of a first message according to one embodiment of the present disclosure.

Embodiment 6 illustrates a flowchart of transmission of a first message according to one embodiment of the present disclosure, as shown in FIG. 6.

In Embodiment 6, a third entity E3 transmits a first message in step S301, and a fourth entity E4 receives a first message in step S401.

In one embodiment, the first message is first information, the third entity E3 belongs to a second node U2, and the fourth entity E4 belongs to a first node U1, the first information being broadcast.

In one subembodiment, the first information is transmitted on a Discovery CHannel.

In one subembodiment, the first information is transmitted on a SideLink Broadcasting CHannel (SL-BCH).

In one embodiment, the first message is first information, the third entity E3 belongs to a second node U2, and the fourth entity E4 belongs to a first node U1, the first information being groupcast.

In one subembodiment, the first information is transmitted on a PSSCH.

In one embodiment, the first message comprises a first ID list.

In one subembodiment, the third entity E3 belongs to a ProSe feature, and the fourth entity E4 belongs to a ProSe application of a first node U1.

In one subembodiment, the third entity E3 belongs to a ProSe application of the second node U2, and the fourth entity E4 belongs to a MAC layer of the second node U2.

In one subembodiment, the third entity E3 belongs to a MAC layer of the second node U2, and the fourth entity E4 belongs to a PHY layer of the second node U2

In one embodiment, the first message indicates a sidelink resource pool, and a first time-frequency resource pool belongs to the sidelink resource pool.

In one subembodiment, the third entity E3 belongs to a base station, and the fourth entity E4 belongs to a first node.

In one subembodiment, the third entity E3 belongs to a base station, and the fourth entity E4 belongs to a second node.

In one subembodiment, the first message is an RRC signaling.

Embodiment 7

Figure 7:
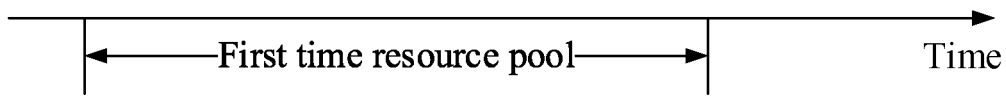
FIG. 7 illustrates a schematic diagram of a first time resource pool according to one embodiment of the present disclosure.

Embodiment 7 illustrates a schematic diagram of a first time resource pool, as shown in FIG. 7.

In Embodiment 7, a first time resource pool is continuous in time domain.

In one embodiment, the first time resource pool comprises a positive integer number of slot(s).

In one embodiment, a slot comprises 14 multicarrier symbols.

In one embodiment, a slot comprises 12 multicarrier symbols.

In one embodiment, a slot comprises a search space of a piece of SCI.

In one embodiment, a first time-frequency resource block belongs to a first slot in time domain; the first slot is behind the first time resource pool.

Embodiment 8

Figure 8:
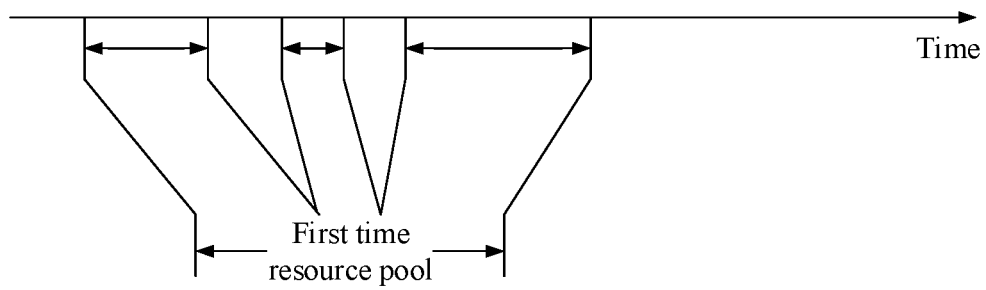
FIG. 8 illustrates a schematic diagram of a first time resource pool according to another embodiment of the present disclosure.

Embodiment 8 illustrates another schematic diagram of a first time resource pool, as shown in FIG. 8.

In Embodiment 8, a first time resource pool is discontinuous in time domain.

In one embodiment, the first time resource pool comprises a positive integer number of slot(s).

In one embodiment, slots in the first time resource pool are reserved for sidelink.

In one embodiment, slots in the first time resource pool are reserved for a sidelink Resource Pool.

In one embodiment, a first time-frequency resource block belongs to a first slot in time domain; the first slot is behind the first time resource pool.

In one embodiment, the first slot is reserved for V2X.

In one embodiment, the first time resource pool and the first slot are reserved for a same V2X resource pool.

Embodiment 9

Figure 9:
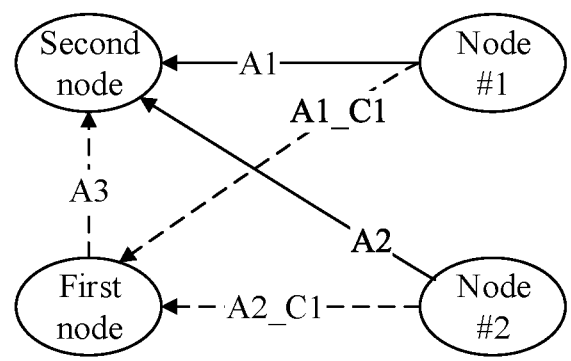
FIG. 9 illustrates a flowchart of multiple nodes in communication with one another according to one embodiment of the present disclosure.

Embodiment 9 illustrates a flowchart of multiple nodes in communication with one another according to one embodiment of the present disclosure, as shown in FIG. 9.

In Embodiment 9, a node #1 and a node #2 are indicated by a Destination ID in a first ID list; the node #1 and the node #2 respectively transmit radio signals to a second node via a link A1 and a link A2; a first node listens on wireless transmissions from the node #1 and the node #2 respectively via a link A1_C1 and a link A2_C1; when the node #1 transmits a first radio signal via the link A1 or the node #2 transmits the first radio signal via the link A2 in a first time resource pool, the first node heard the first radio signal.

In Embodiment 9, a second node determines whether to start or restart a first timer according to whether a first radio signal is received, and a first node determines whether to start or restart a first reference timer according to whether the first radio signal is received; the first timer and the first reference timer are respectively used by the second node and the first node for determining an active time of the second node; on the premise that the first radio signal is precisely demodulated by the first node and the second node respectively, the first timer and the first reference timer are in a totally same state and having a same counting, which means that the first node can acquire the active time of the second node accurately so as to choose the active time in preference for transmitting a first signaling.

In one embodiment, whether the first node is required to choose the active time of the second node for transmitting the first signaling may also be influenced by other factors, such as buffer state, the priority of data scheduled by the first signaling and manufacturers' scheduling algorithms.

In one embodiment, the first node is indicated by a Destination ID in a first ID list, when the first node transmits a first radio signal in a first time resource pool via a link A3, the first node determines that the first radio signal is listened in on by the second node, and then stops sensing in the first time resource pool.

In one embodiment, the first timer is a DRX inactivity timer.

In one embodiment, the first timer is a Sidelink DRX inactivity timer.

In one embodiment, the first reference timer is a counterpart of the first timer maintained by the first node.

In one embodiment, the first timer is an onduration timer.

In one embodiment, the first timer is a Sidelink onduration timer.

In one embodiment, when the first timer is in operation, the second node is at an active time.

In one embodiment, an expiration value for the first timer is configured by a base station.

In one embodiment, an expiration value for the first timer is reported by the second node to the first node.

In one embodiment, a DRX short cycle or a DRX long cycle is reported by the second node to the first node, and the first timer is combined with either of the DRX short cycle or the DRX long cycle to determine an active time of the second node.

Embodiment 10

Figure 10:
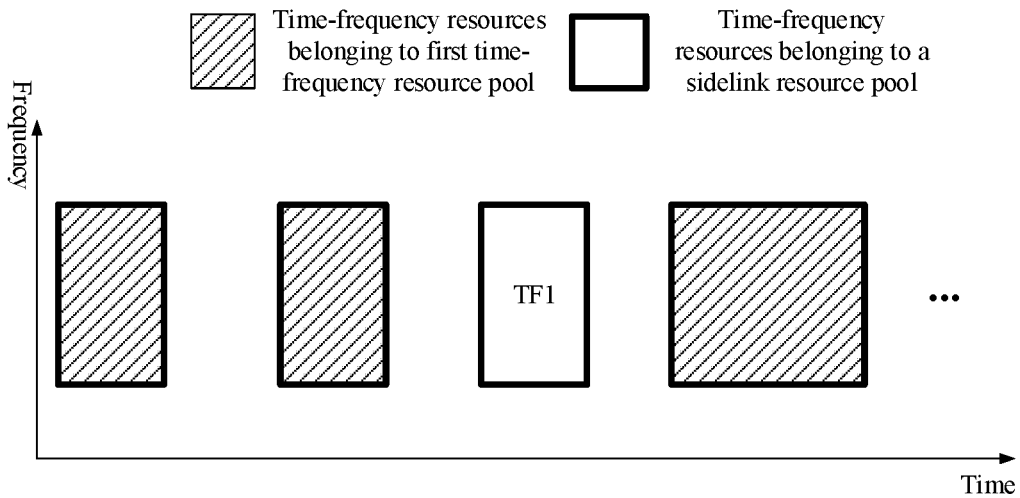
FIG. 10 illustrates a schematic diagram of a first time-frequency resource pool according to one embodiment of the present disclosure.

Embodiment 10 illustrates a schematic diagram of a first time-frequency resource pool according to one embodiment of the present disclosure, as shown in FIG. 10. In FIG. 10, a blank box framed with thick solid lines represents time-frequency resources belonging to a sidelink resource pool, and a box filled with slashes represents time-frequency resources belonging to a first time-frequency resource pool.

In conventional schemes, a first node can select time-frequency resources applicable to wireless transmission used for sidelink through Channel Sensing in a sidelink resource pool.

In Embodiment 10, a first node selects a first time-frequency resource block from a first time-frequency resource pool rather than a sidelink resource pool, and transmits a first signaling in the first time-frequency resource block. The first time-frequency resource pool lacks time-frequency resources identified by a TFI compared with the sidelink resource pool.

In one embodiment, a first reference timer is in a halted state on time-domain resources corresponding to time-frequency resources identified by the TF1.

In one embodiment, a second node is at an active time on time-domain resources corresponding to time-frequency resources identified by the TFI.

In one embodiment, the Embodiment 10 can prevent invalid transmission of the first node in the TF1, thereby reducing power consumption of the first node and interferences in the wireless system.

Embodiment 11

Figure 11:
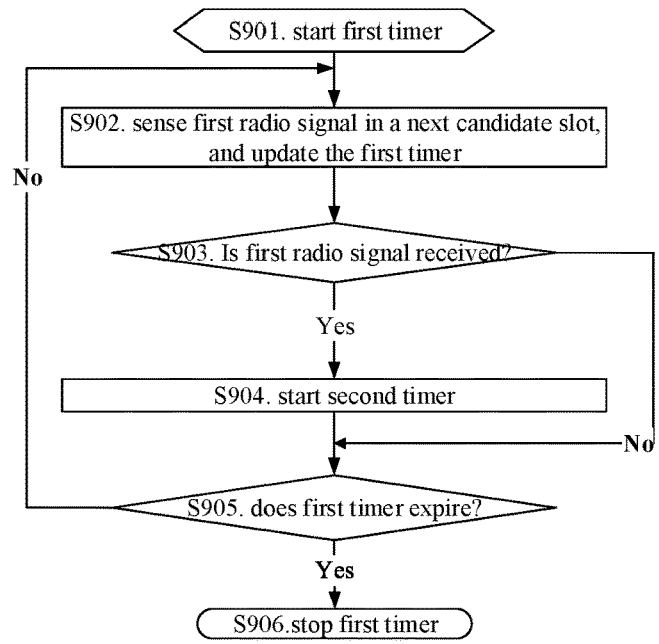
FIG. 11 illustrates a flowchart of timekeeping by utilizing a first timer according to one embodiment of the present disclosure.

Embodiment 11 illustrates a flowchart of timekeeping by utilizing a first timer according to one embodiment of the present disclosure, as shown in FIG. 11. Steps illustrated by FIG. 11 are implemented in a second node.

In step S901, start a first timer; sense a first radio signal in a next candidate slot and update a first timer in step S902; determine in step S903 whether the first radio signal is received; if so, start a second timer in step S904, if not, determine in step S905 whether the first timer is expired; if so, stop the first timer in step S906; if no, skip to the step S902.

In one embodiment, the first timer and the second timer are respectively a onduration timer and a DRX inactivity timer.

In one embodiment, when one of the first timer and the second timer is in operation, the second node is at an active time.

In one embodiment, a first node maintains a first reference timer and a second reference timer, and the first reference timer and the second reference timer are respectively counterparts of the first timer and the second timer.

In one embodiment, on the premise of precise sensing of the first radio signal, a first reference timer and a second reference timer respectively remain in a same state as the first timer and the second timer.

In one embodiment, the phrase of starting a first timer is to set the first timer as 0, and the phrase of updating a first timer is to increment the first timer's value by 1; if the first timer is equal to a first integer, the first timer is expired, otherwise, the first timer is not yet expired.

In one embodiment, the phrase of starting a first timer is to set the first timer as a first integer, and the phrase of updating a first timer is to decrement the first timer's value by 1; if the first timer is equal to 0, the first timer is expired, otherwise, the first timer is not yet expired.

In one embodiment, the first integer is fixed.

In one embodiment, the first integer is configured by a downlink signaling.

In one embodiment, the downlink signaling is a higher-layer signaling.

In one embodiment, the downlink signaling is broadcast.

In one embodiment, the next candidate slot is a nearest upcoming slot.

In one embodiment, the next candidate slot is a nearest upcoming slot reserved for V2X.

In one embodiment, the next candidate slot is a nearest upcoming slot reserved for a same V2X Resource Pool.

In one embodiment, the first timer is maintained on the MAC layer.

In one embodiment, the first timer is maintained by a MAC entity.

Embodiment 12

Figure 12:
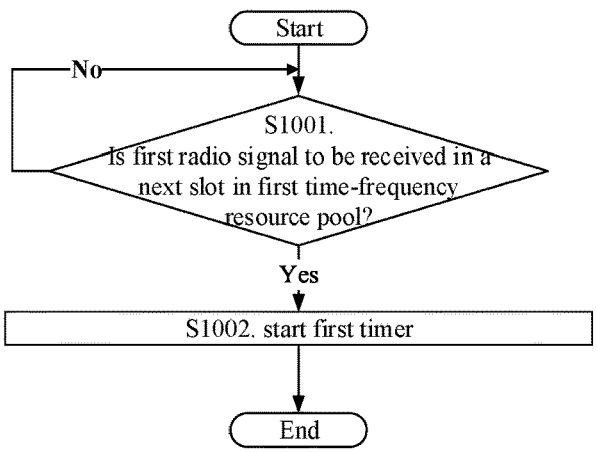
FIG. 12 illustrates a flowchart of timekeeping by utilizing a first timer according to another embodiment of the present disclosure.

Embodiment 12 illustrates a flowchart of timekeeping by utilizing a first timer according to another embodiment of the present disclosure, as shown in FIG. 12. Steps illustrated by FIG. 12 are implemented in a second node.

In step S1001, sense a first radio signal in a next candidate slot in a first time-frequency resource pool; if the first radio signal is received, start a first timer in step S1002; if not, return to the step S1001.

In one embodiment, the first timer is a DRX inactivity timer.

In one embodiment, the phrase of starting a first timer is to set the first timer as 0, and the phrase of updating a first timer is to increment the first timer's value by 1; if the first timer is equal to a second integer, the first timer is expired, otherwise, the first timer is not yet expired.

In one embodiment, the phrase of starting a first timer is to set the first timer as a second integer, and the phrase of updating a first timer is to decrement the first timer's value by 1; if the first timer is equal to 0, the first timer is expired, otherwise, the first timer is not yet expired.

In one embodiment, the second integer is fixed.

In one embodiment, the second integer is configured by a downlink signaling.

In one embodiment, the downlink signaling is a higher-layer signaling.

In one embodiment, the downlink signaling is broadcast.

In one embodiment, the next candidate slot is a nearest upcoming slot.

In one embodiment, the next candidate slot is a nearest upcoming slot reserved for V2X and at an active time.

In one embodiment, the next candidate slot is a nearest upcoming slot reserved for a same V2X Resource Pool and at an active time.

In one embodiment, the first timer is maintained on the MAC layer.

In one embodiment, the first timer is maintained by a MAC entity.

In one embodiment, when the first timer is in operation, the second node is in a state of DRX.

In one embodiment, when the first timer is in operation, the second node is at an Active Time.

In one embodiment, when the first timer is in operation, the second node senses a physical layer signaling in all D2D resource pools.

In one embodiment, when the first timer is in operation, the second node senses a physical layer signaling in all V2X resource pools.

In one embodiment, when the first timer is in operation, the second node senses DCI in a downlink slot.

Embodiment 13

Figure 13:
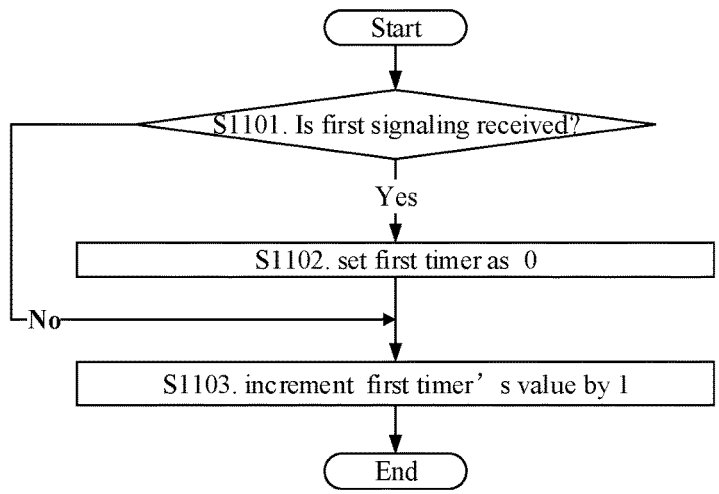
FIG. 13 illustrates a flowchart of updating a first timer according to one embodiment of the present disclosure.

Embodiment 13 illustrates a flowchart of updating a first timer according to one embodiment of the present disclosure, as shown in FIG. 13. The Embodiment 13 can be seen as a specific implementation of the step S1002 in Embodiment 12, with the action of starting revised as "restarting".

In step S1101, determine whether a first signaling is received, if so, set a first timer as 0 in step S1102, if not, increment the first timer's value by 1 in step S1103.

Embodiment 14

Figure 14:
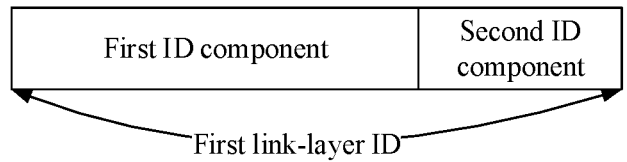
FIG. 14 illustrates a schematic diagram of a first link-layer ID according to one embodiment of the present disclosure.

Embodiment 14 illustrates a schematic diagram of a first link-layer ID according to one embodiment of the present disclosure, as shown in FIG. 14.

In Embodiment 14, the first link-layer ID is composed of a first ID component and a second ID component.

In one embodiment, the first ID component and the second ID component are respectively composed of 16 bits and 8 bits.

In one embodiment, the first ID component and the second ID component are respectively carried by SCI and a PSSCH.

In one embodiment, any Destination ID in the first ID list is a first link-layer ID.

In one embodiment, any Destination ID in the first ID list is a first ID component in a first link-layer ID.

In one embodiment, any Destination ID in the first ID list is a second ID component in a first link-layer ID.

Embodiment 15

Figure 15:
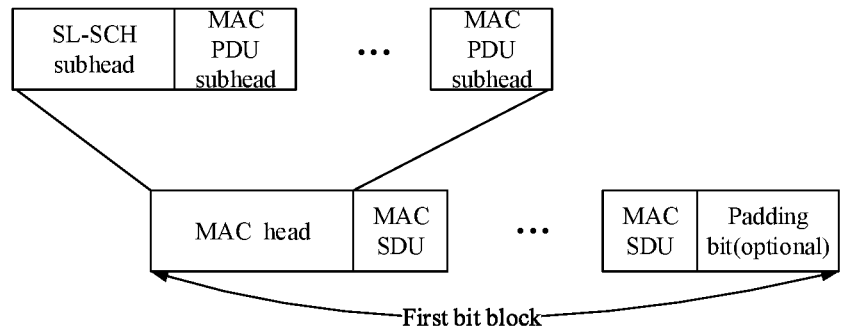
FIG. 15 illustrates a schematic diagram of a first bit block according to one embodiment of the present disclosure.

Embodiment 15 illustrates a schematic diagram of a first bit block according to one embodiment of the present disclosure, as shown in FIG. 15.

In Embodiment 15, the first bit block comprises a MAC head, and at least one MAC SDU, and also optional padding bit; the MAC head comprises a SL-SCH subhead and at least one MAC PDU subhead. The SL-SCH subhead comprises a first ID component.

Embodiment 16

Figure 16:
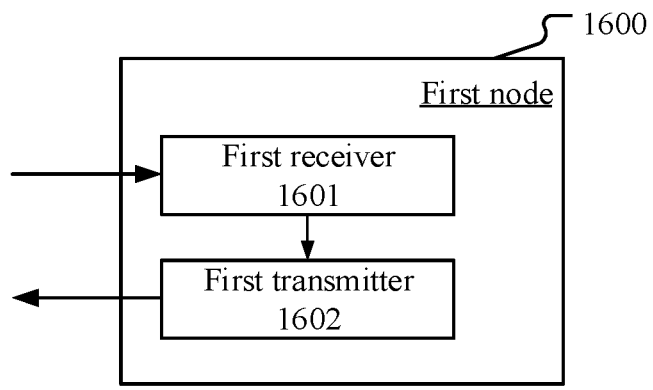
FIG. 16 illustrates a structure block diagram of a processing device in a first node according to one embodiment of the present disclosure.

Embodiment 16 illustrates a structure block diagram of a processing device in a first node according to one embodiment of the present disclosure, as shown in FIG. 16. In FIG. 16, a processing device 1600 in a first node comprises a first receiver 1601 and a first transmitter 1602.

The first receiver 1601 receives first information; senses a first radio signal in a first time resource pool; the first transmitter 1602 selects a first time-frequency resource block from a first time-frequency resource pool, and transmits a first signaling in the first time-frequency resource block.

In Embodiment 16, the first information indicates a first ID list; the first ID list comprises at least one Destination ID; the first radio signal comprises any Destination ID in the first ID list; a bit block identified by the at least one Destination ID is not a bit (bits) useful for the first node; the sensing action in the first time resource pool is used for determining the first time-frequency resource pool.

In one embodiment, when the first radio signal is not successfully received in the first time resource pool, the first receiver maintains counting of a first reference timer; when the first radio signal is successfully received in the first time resource pool, the first receiver restarts a first reference timer; herein, in time domain the first time-frequency resource pool is not overlapping with time during which the first reference timer is halted.

In one embodiment, when the first radio signal is not successfully received in the first time resource pool, the first receiver maintains a halted state of a first reference timer; when the first radio signal is successfully received in the first time resource pool, the first receiver starts a first reference timer; herein, in time domain the first time-frequency resource pool is not overlapping with time during which the first reference timer is halted.

In one embodiment, a channel occupied by the first radio signal is a PSCCH, and any Destination ID in the first ID list is a Destination ID field in SCI.

In one embodiment, a transmission channel occupied by the first radio signal is an SL-SCH, and any Destination ID in the first ID list is a Destination Layer-2 ID.

In one embodiment, a transmitter of the first information is a second node, and any Destination ID in the first ID list belongs to a Destination Layer-2 ID of the second node.

In one embodiment, the first transmitter 1602 transmits a target signal in the first time resource pool, the target signal comprising a Destination ID in the first ID list;

herein, the first radio signal is deemed as being successfully received in the first time resource pool no matter whether the first radio signal is detected during the sensing in the first time resource pool.

In one embodiment, the first node 1600 is a UE.

In one embodiment, the first transmitter 1602 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the first transmitter 1602 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present disclosure.

Embodiment 17

Figure 17:
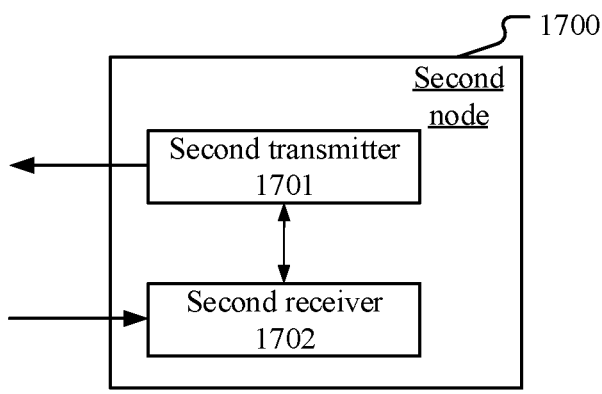
FIG. 17 illustrates a structure block diagram of a processing device in a second node according to one embodiment of the present disclosure.

Embodiment 17 illustrates a structure block diagram of a processing device in a second node according to one embodiment of the present disclosure; as shown in FIG. 17. In FIG. 17, a processing device 1700 in a second node comprises a second transmitter 1701 and a second receiver 1702.

The second transmitter 1701 transmits first information; the second receiver 1702 senses a first radio signal in a first time resource pool; and senses a first signaling in a first time-frequency resource block.

In Embodiment 17, the first information indicates a first ID list; the first ID list comprises at least one Destination ID; the first radio signal comprises any Destination ID in the first ID list; a bit block identified by the at least one Destination ID is a bit (bits) useful for the second node; the sensing action in the first time resource pool is used for determining the first time-frequency resource pool.

In one embodiment, when the first radio signal is not successfully received in the first time resource pool, the second receiver 1702 maintains counting of a first timer; when the first radio signal is successfully received in the first time resource pool, the second receiver 1702 restarts a first timer; herein, in time domain the first time-frequency resource pool comprises time during which the first timer is operating.

In one embodiment, when the first radio signal is not successfully received in the first time resource pool, the second receiver 1702 maintains a halted state of a first timer; when first radio signal is successfully received in the first time resource pool, the second receiver 1702 starts a first timer; herein, in time domain the first time-frequency resource pool comprises time during which the first timer is operating.

In one embodiment, a channel occupied by the first radio signal is a PSCCH, and any Destination ID in the first ID list is a Destination ID field in SCI.

In one embodiment, a transmission channel occupied by the first radio signal is an SL-SCH, and any Destination ID in the first ID list is a Destination Layer-2 ID.

In one embodiment, any Destination ID in the first ID list belongs to a Destination Layer-2 ID of the second node.

In one embodiment, the second node 1700 is a UE.

In one embodiment, the second transmitter 1701 comprises the antenna 420, the transmitter 418, the transmitting processor 416 and the controller/processor 475.

In one embodiment, the second transmitter 1701 comprises the antenna 420, the transmitter 418, the multi-antenna transmitting processor 471, the transmitting processor 416 and the controller/processor 475.

In one embodiment, the second transmitter 1701 comprises the antenna 420, the transmitter 418, the transmitting processor 416 and the controller/processor 475.

In one embodiment, the second transmitter 1701 comprises the antenna 420, the transmitter 418, the multi-antenna transmitting processor 471, the transmitting processor 416 and the controller/processor 475.

In one embodiment, the second receiver 1702 comprises the antenna 420, the receiver 418, the multi-antenna receiving processor 472, the receiving processor 470 and the controller/processor 475.

In one embodiment, the second receiver 1702 comprises the controller/processor 475.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives first information; and senses a first radio signal in a first time resource pool; and
a first transmitter, which selects a first time-frequency resource block from a first time-frequency resource pool, and transmits a first signaling in the first time-frequency resource block;
wherein the first information indicates a first identity (ID) list; the first ID list comprises at least one Destination ID; the first radio signal comprises any Destination ID in the first ID list; a bit block identified by the at least one Destination ID is not a bit (bits) useful for the first node; a sensing action in the first time resource pool is used for determining the first time-frequency resource pool;
wherein a bit block identified by the at least one Destination ID is deemed not a bit (bits) useful for the first node when the first node does not perform channel decoding for a PSSCH scheduled by SCI carrying the at least one Destination ID, or when a MAC entity of the first node doesn't distribute a MAC Protocol Data Unit (PDU) carrying the at least one Destination ID to a disassembly and demultiplexing entity.

2. The first node according to claim 1, comprising:
when the first radio signal is not successfully received in the first time resource pool, the first receiver maintains counting of a first reference timer; when the first radio signal is successfully received in the first time resource pool, the first receiver restarts a first reference timer;
wherein in time domain, the first time-frequency resource pool does not overlap with a duration during which the first reference timer is inactive.

3. The first node according to claim 1, comprising:
when the first radio signal is not successfully received in the first time resource pool, the first receiver maintains a first reference timer inactive; when the first radio signal is successfully received in the first time resource pool, the first receiver starts a first reference timer;
wherein in time domain the first time-frequency resource pool does not overlap with a duration during which the first reference timer is inactive.

4. The first node according to claim 1, wherein a channel occupied by the first radio signal is a PSCCH, and any Destination ID in the first ID list is a Destination ID field in SCI.

5. The first node according to claim 1, wherein a transmission channel occupied by the first radio signal is an SL-SCH, and any Destination ID in the first ID list is a Destination Layer-2 ID.

6. The first node according to claim 1, wherein a transmitter of the first information is a second node, and any Destination ID in the first ID list belongs to a Destination Layer-2 ID of the second node.

7. The first node according to claim 1, comprising:
the first transmitter, which transmits a target signal in the first time resource pool, the target signal comprising a Destination ID in the first ID list;
wherein the first radio signal is deemed as being successfully received in the first time resource pool no matter whether the first radio signal is detected during the sensing in the first time resource pool.

8. A second node for wireless communications, comprising:
a second transmitter, which transmits first information; and
a second receiver, which senses a first radio signal in a first time resource pool; and senses a first signaling in a first time-frequency resource block;
wherein the first information indicates a first ID list; the first ID list comprises at least one Destination ID; the first radio signal comprises any Destination ID in the first ID list;
a bit block identified by the at least one Destination ID is a bit (bits) useful for the second node; a sensing action in the first time resource pool is used for determining the first time-frequency resource pool;

wherein a bit block identified by the at least one Destination ID is deemed not a bit (bits) useful for the first node when the first node does not perform channel decoding for a PSSCH scheduled by SCI carrying the at least one Destination ID, or when a MAC entity of the first node doesn't distribute a MAC Protocol Data Unit (PDU) carrying the at least one Destination ID to a disassembly and demultiplexing entity.

9. The second node according to claim 8, comprising:
when the first radio signal is not successfully received in the first time resource pool, the second receiver maintains counting of a first timer; when the first radio signal is successfully received in the first time resource pool, the second receiver restarts a first timer;
wherein in time domain the first time-frequency resource pool comprises time during which the first timer is operating.

10. The second node according to claim 8, comprising:
when the first radio signal is not successfully received in the first time resource pool, the second receiver maintains a first timer inactive; when first radio signal is successfully received in the first time resource pool, the second receiver starts a first timer;
wherein in time domain the first time-frequency resource pool comprises time during which the first timer is operating.

11. The second node according to claim 8, wherein a channel occupied by the first radio signal is a PSCCH, and any Destination ID in the first ID list is a Destination ID field in SCI.

12. The second node according to claim 8, wherein a transmission channel occupied by the first radio signal is an SL-SCH, and any Destination ID in the first ID list is a Destination Layer-2 ID.

13. The first node according to claim 8, wherein any Destination ID in the first ID list belongs to a Destination Layer-2 ID of the second node.

14. A method in a first node for wireless communications, comprising:
receiving first information; and sensing a first radio signal in a first time resource pool; and
selecting a first time-frequency resource block from a first time-frequency resource pool, and transmitting a first signaling in the first time-frequency resource block;
wherein the first information indicates a first identity (ID) list; the first ID list comprises at least one Destination ID; the first radio signal comprises any Destination ID in the first ID list; a bit block identified by the at least one Destination ID is not a bit (bits) useful for the first node; a sensing action in the first time resource pool is used for determining the first time-frequency resource pool;

wherein a bit block identified by the at least one Destination ID is deemed not a bit (bits) useful for the first node when the first node does not perform channel decoding for a PSSCH scheduled by SCI carrying the at least one Destination ID, or when a MAC entity of the first node doesn't distribute a MAC Protocol Data Unit (PDU) carrying the at least one Destination ID to a disassembly and demultiplexing entity.

15. The method in the first node for wireless communications according to claim 11, comprising:
when the first radio signal is not successfully received in the first time resource pool, maintaining counting of a first reference timer; when the first radio signal is successfully received in the first time resource pool, restarting a first reference timer;
wherein in time domain the first time-frequency resource pool does not overlap with a duration during which the first reference timer is inactive.

16. The method in the first node for wireless communications according to claim 14, comprising:
when the first radio signal is not successfully received in the first time resource pool, maintaining a first reference timer inactive; when the first radio signal is successfully received in the first time resource pool, starting a first reference timer;
wherein in time domain the first time-frequency resource pool does not overlap with a duration during which the first reference timer is inactive.

17. The method in the first node for wireless communications according to claim 14, wherein a channel occupied by the first radio signal is a PSCCH, and any Destination ID in the first ID list is a Destination ID field in SCI.

18. The method in the first node for wireless communications according to claim 14, wherein a transmission channel occupied by the first radio signal is an SL-SCH, and any Destination ID in the first ID list is a Destination Layer-2 ID.

19. The method in the first node for wireless communications according to claim 14, wherein a transmitter of the first information is a second node, and any Destination ID in the first ID list belongs to a Destination Layer-2 ID of the second node.

20. The method in the first node for wireless communications according to claim 14, comprising:
transmitting a target signal in the first time resource pool, the target signal comprising a Destination ID in the first ID list;
wherein the first radio signal is deemed as being successfully received in the first time resource pool no matter whether the first radio signal is detected during the sensing in the first time resource pool.

* * * * *